United States Patent
Satapathy

(10) Patent No.: US 7,522,518 B1
(45) Date of Patent: Apr. 21, 2009

(54) WIRELESS LAN COMMUNICATION SYSTEM WITH IN-ZONE USER PREFERENCES

(75) Inventor: Durga P. Satapathy, Olathe, KS (US)

(73) Assignee: Sprint Communications Company LP, Overland Park, KS (US)

( * ) Notice: Subject to any disclaimer, the term of this patent is extended or adjusted under 35 U.S.C. 154(b) by 1100 days.

(21) Appl. No.: 10/464,922

(22) Filed: Jun. 19, 2003

(51) Int. Cl.
*H04Q 7/20* (2006.01)
(52) U.S. Cl. .................................. 370/229; 370/338
(58) Field of Classification Search .............. 370/328, 370/331, 395.41, 395.42, 338, 229, 329
See application file for complete search history.

(56) References Cited

U.S. PATENT DOCUMENTS

| | | | |
|---|---|---|---|
| 6,377,548 B1 | 4/2002 | Chuah | |
| 6,404,772 B1 | 6/2002 | Beach et al. | |
| 6,539,237 B1 | 3/2003 | Sayers et al. | |
| 6,721,290 B1* | 4/2004 | Kondylis et al. | 370/329 |
| 7,151,762 B1* | 12/2006 | Ho et al. | 370/338 |
| 2002/0085516 A1 | 7/2002 | Bridgelall | |
| 2002/0110105 A1 | 8/2002 | Atwater et al. | |
| 2003/0179756 A1* | 9/2003 | Cain | 370/395.42 |
| 2003/0235164 A1* | 12/2003 | Rogers et al. | 370/331 |
| 2004/0015602 A1* | 1/2004 | Goldhammer et al. | 709/235 |
| 2004/0090930 A1* | 5/2004 | Lee et al. | 370/328 |

OTHER PUBLICATIONS

Spectra-Link, *The Link Wireless Telephone System Product Description*, Issue 1.2, Dec. 1999, pp. 1-17.
Symbol Technologies, Inc., *Voice and Data on One Wireless LAN*, 1999, pp. 1-7.
Agere Systems, *WaveLAN 802.11a/b/g Chip Set Product Brief*, Feb. 2003, pp. 1-6.
Spectra-Link, *Link Wireless Telephone System Bringing Mobility to Workplace Communications*, 2003, pp. 1-2.
Intersil, *Wireless LAN Access Point Controller Preliminary Data Sheet*, Apr. 2002, pp. 1-18.

* cited by examiner

*Primary Examiner*—Min Jung

(57) ABSTRACT

Access is controlled to wireless access points connected in a wireless local area network (WLAN) providing telecommunications service for authorized users with wireless handsets. Identities of priority users are configured for a predetermined access point. Wireless users within range are associated to the predetermined access point. Bandwidth consumption data is aggregated corresponding to the associated wireless users. The aggregated consumption data is compared with a predetermined bandwidth capacity of the predetermined access point. If the aggregated consumption data is not less than the predetermined bandwidth capacity then use of the access point by a non-priority associated user having an identity that is not configured as one of the priority users is limited.

18 Claims, 5 Drawing Sheets

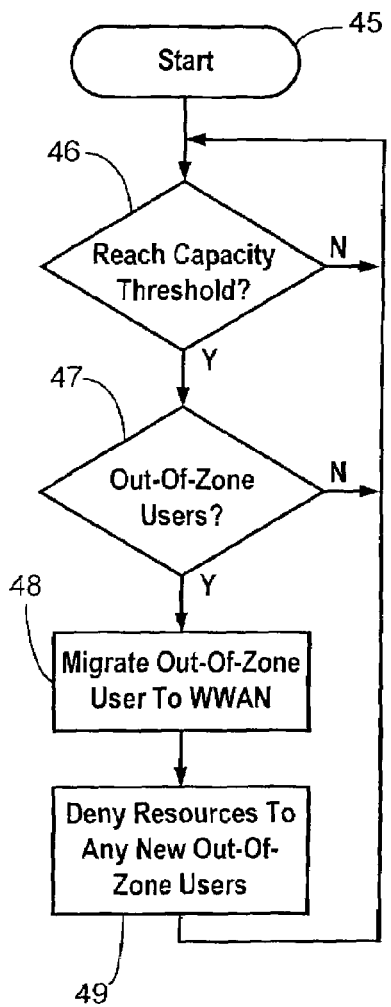
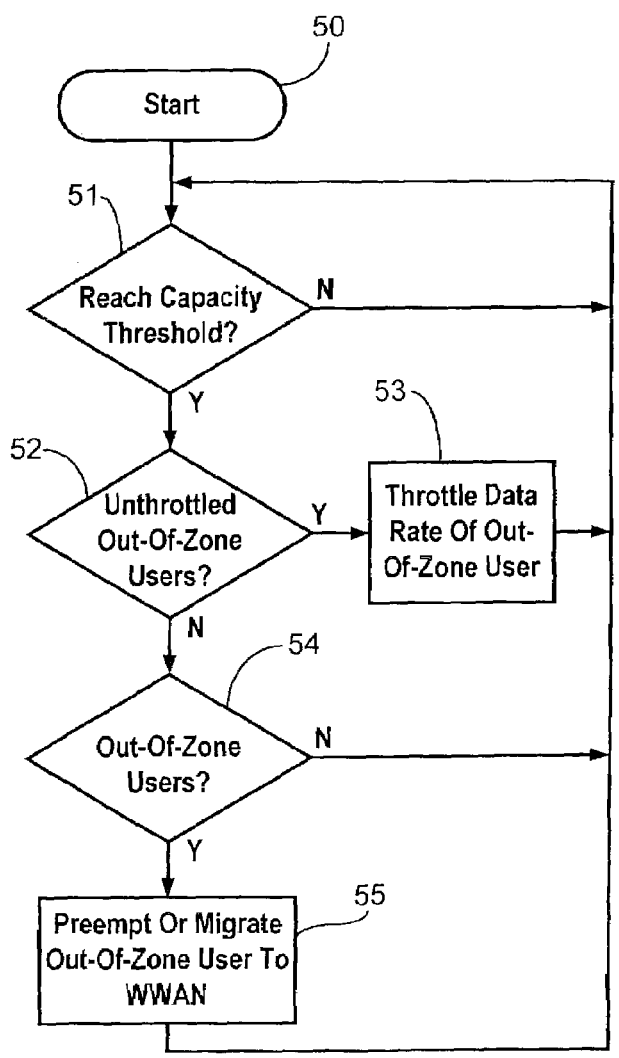
Fig. 3
Fig. 4

WIRELESS LAN COMMUNICATION SYSTEM WITH IN-ZONE USER PREFERENCES

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to dual mode WLAN/WWAN telecommunication systems, and, more specifically, to maintaining Quality of Service (QoS) in the WLAN.

Wireless local area network (WLAN) telecommunication systems are being used in many workplace/office settings as an alternative to traditional, hardwired private branch exchange (PBX) and Centrex systems. WLAN systems comprise an array of wireless access points (AP's) deployed within a building connected by a wired LAN and communicating wirelessly with telephone appliances carried by individual system users. Each access point provides a respective coverage area such that coverage areas overlap and users can maintain a constant network connection as they move (i.e., roam) throughout the building.

WLAN systems provide many benefits over wired systems such as lower installation, upgrading, and maintenance costs. They provide a wide array of telephone features, which are easy to add and modify for new and existing users. Voice calls between users of the WLAN system are free of airtime or other charges. Gateways are used to interface the WLAN system with wireless wide area network (WWAN) systems such as cellular networks and with the public switched telephone network (PSTN) for establishing voice calls between WLAN users and conventional phone customers.

In dual mode WLAN/WWAN systems, a user's phone call is carried by the WLAN while in the workplace and is then handed off to the WWAN when the user moves out of range of the WLAN. Migration of active calls between the two networks is shown, for example, by United States Publication 2002/0085516A1, entitled "Automatic and Seamless Vertical Roaming Between Wireless Local Area Network (WLAN) and Wireless Wide Area Network (WWAN) While Maintaining an Active Voice or Streaming Data Connection: Systems, Methods and Program Products". Preferably, a single phone appliance incorporates transceivers for operating with both networks so that the handoff between the two systems is transparent to the user.

Each wireless access point connected within a WLAN has a certain throughput capacity or bandwidth. Consumption of the bandwidth depends upon the number of users associated with the AP and their level of activity at any one time. When the aggregated traffic of all users approaches the bandwidth capacity of the AP, then issues of quality of service provided to the users arises. Typical mechanisms for controlling QoS give priority to one type of traffic over another or one class of subscribers over another. For example, it is known in WLAN systems to give priority to all voice traffic over any data services being accessed over the network.

The coverage area of any particular wireless access point may include workplace areas subject to different typical uses. For example, primary workstations such as an office desk of a user may be covered as well as transient or secondary work areas for all employees in a building such as conference rooms, file rooms, lunch rooms, or others. Consequently, the priority of voice over data traffic may not always be desirable. For example, a user at their desk may be accessing a data service via a particular access point, while a voice user who is roaming enters the particular access point coverage area. It may undesirable disrupt the data traffic of the user at their desk, especially when the voice call of the roaming user could be migrated to the WWAN system.

SUMMARY OF THE INVENTION

The present invention has the advantage of providing priority access to WLAN capacity for intended users who are "in zone" as opposed to transient traffic from "out-of-zone" users or visitors.

In one aspect of the invention, a method is provided for controlling access to wireless access points connected in a wireless local area network (WLAN) providing telecommunications service for authorized users with wireless handsets. Identities of priority users are configured for a predetermined access point. Wireless users within range are associated to the predetermined access point. Bandwidth consumption data is aggregated corresponding to the associated wireless users. The aggregated consumption is compared with a predetermined bandwidth capacity of the predetermined access point. If the aggregated consumption is not less than the predetermined bandwidth capacity then use of the access point by a non-priority associated user having an identity that is not configured as one of the priority users is limited.

BRIEF DESCRIPTION OF THE DRAWINGS

FIG. 3 is a flowchart showing a preferred method of the present invention.

FIG. 4 is a flowchart showing a preferred method for handling data traffic.

DETAILED DESCRIPTION OF PREFERRED EMBODIMENTS

Figure 1:
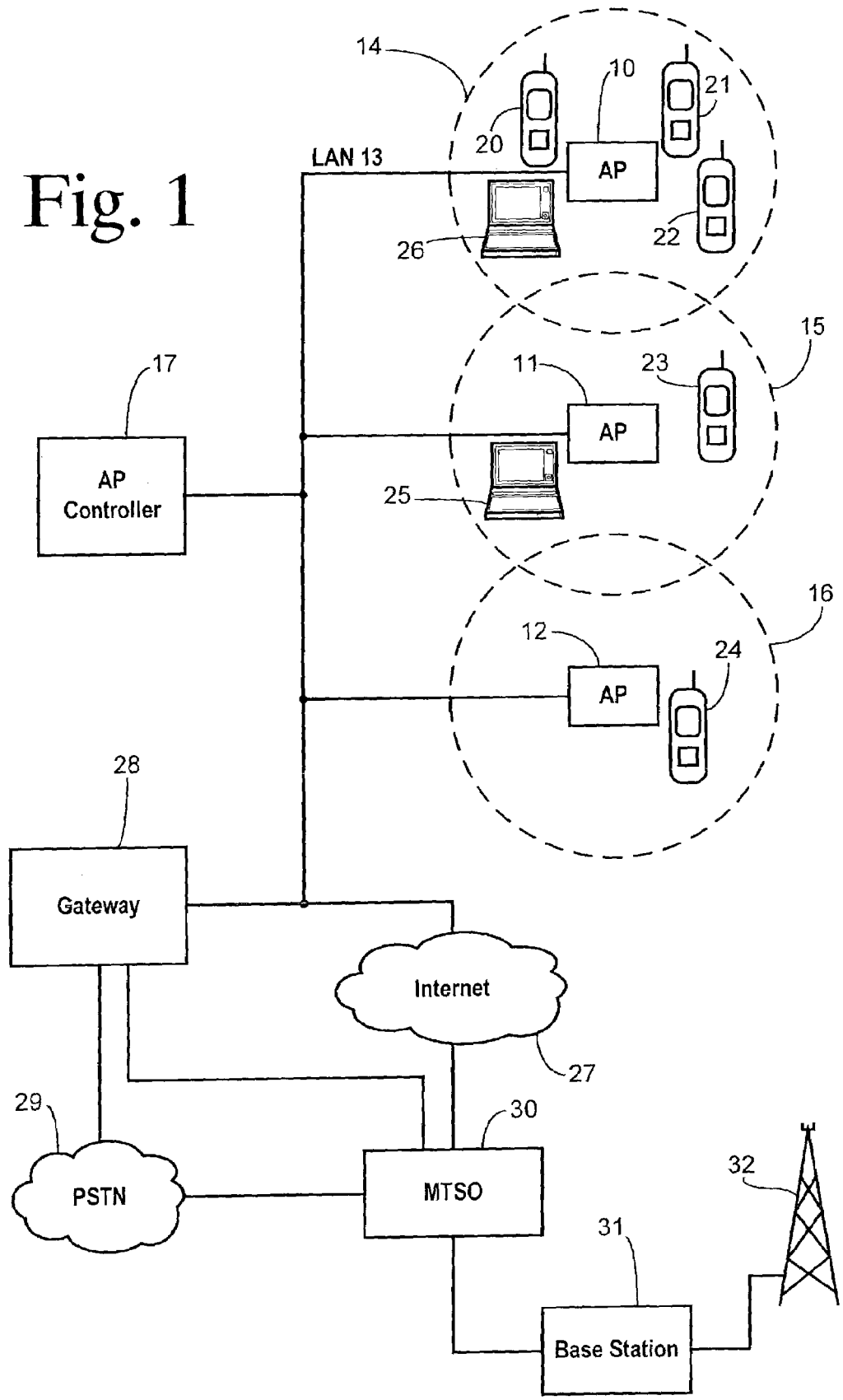
FIG. 1 is a block diagram showing a dual mode WLAN/WWAN system of the present invention.

Referring to FIG. 1, wireless access points 10, 11, and 12 are deployed in a building and interconnected by a local area network (LAN) 13. AP's 10, 11, and 12 provide coverage areas 14, 15, and 16, respectively, to provide overlapping coverage to support roaming of the users. A wireless access point controller 17 is connected to LAN 13 for providing centralized control of all the access points. Alternatively, separate controllers may be integrated within each access point.

Wireless devices for communicating with the access points include wireless telephone appliances 20-24 and personal computers 25 and 26 equipped with wireless transceivers. The foregoing WLAN system may be comprised of a Spectrum 24 system from Symbol Technologies, Inc., or a Link Wireless Telephone System (Link WTS) from SpectraLink Corporation, for example. LAN 13 is coupled to Internet 27 for exchanging data traffic therewith. Voice traffic may be exchanged with other telephone users via a gateway 28 connected to LAN 13. Gateway 28 is connected to PSTN 29 and to a mobile telephone switching office (MTSO) 30, which is part of a WWAN cellular telephone service. Thus, MTSO 30 is connected to a base station 31, which is connected with a WWAN transmitter 32. MTSO 30 may also be connected with Internet 27 for providing data services to the WWAN users.

Appliances 20-24 and PC's 25 and 26 are registered within the WLAN system so that they may access the network via any wireless access point. The present invention defines users as being "in-zone" for a predetermined wireless access point and grants the in-zone users priority in accessing the corresponding AP. In-zone status may be determined, for example, by the location of an employee's primary workstation or office and their typical mobility patterns (e.g., trips to a printer or location of shared documents). A particular user may be registered as an in-zone user of one or more access points. When connecting via any other access point, the user is "out-of-zone". In addition to registered users not at their primary workstation, out-of-zone users may also include unregistered visitors when the WLAN is open to the public.

Figure 2:
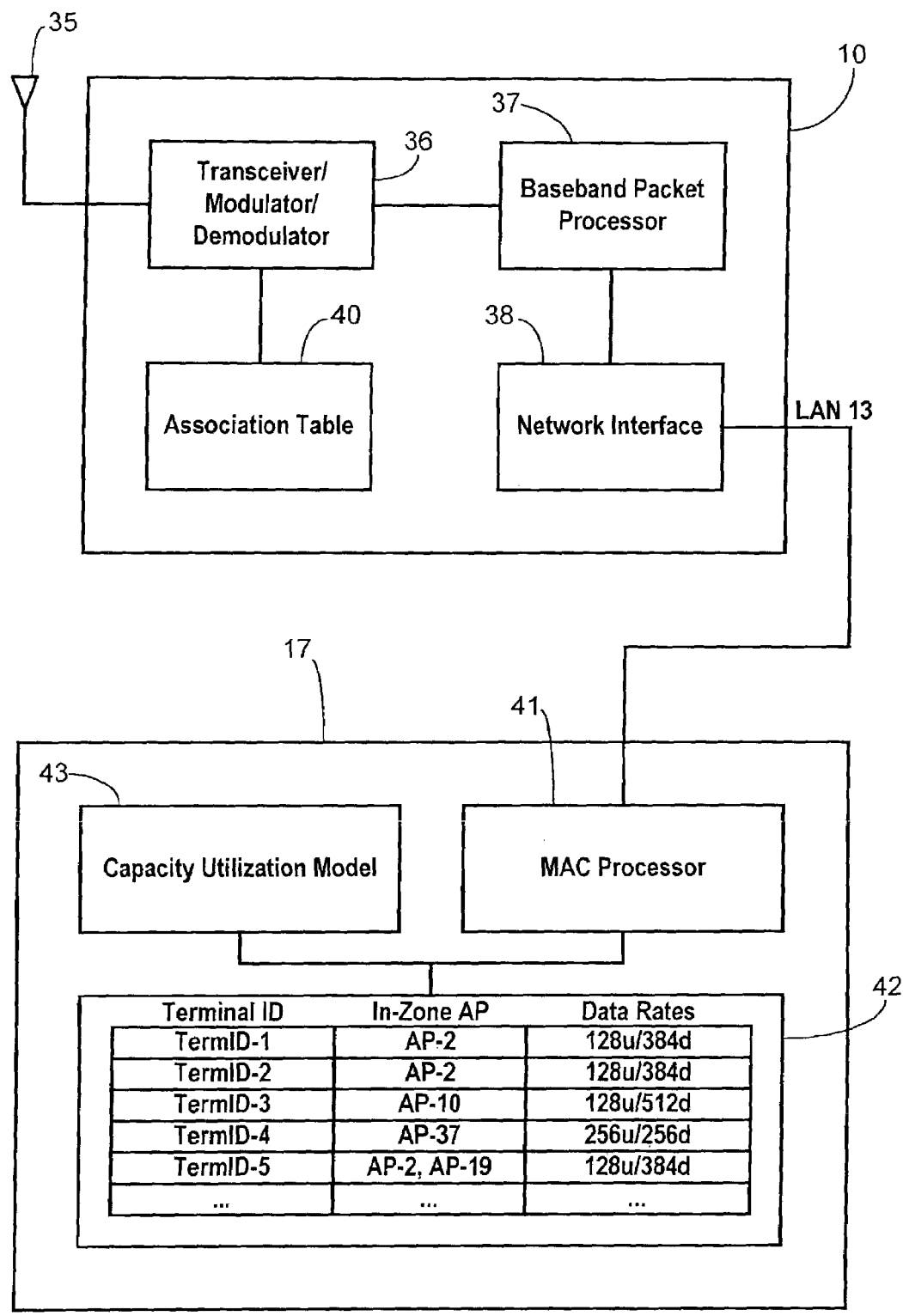
FIG. 2 is a block diagram showing a wireless access point and wireless access point controller in greater detail.

As shown in FIG. 2, AP 10 includes an antenna 35 connected to a transceiver/modulator/demodulator 36. A baseband packet processor 37 is connected to transceiver 36 and to a network interface 38 for coupling with LAN 13. An association table 40 keeps track of active wireless devices within the coverage area of AP 10 that are associated with (i.e., have been granted access to) AP 10. AP controller 17 includes a media access control (MAC) processor 41 connected to a registration database 42. Database 42 lists a terminal ID for each registered user on the WLAN system. In addition to the terminal ID, each database entry identifies the predetermined access points where the corresponding user is designated as being "in-zone". Furthermore, each user may be assigned data rate bandwidths for accessing digital data services. Thus, a first user with a terminal ID of "TermID-1" is an in-zone user for an access point "AP-2" and is allocated data rates of 128 kilobits per second upload and 384 kilobits per second download.

AP controller 17 includes a capacity utilization module 43 coupled to MAC processor 41. Based upon the identity of terminals associated with a particular access point, the services used by the identified terminals, and the allocated bandwidth corresponding to the services being used, capacity utilization model 43 determines the bandwidth capacity of each access point that is currently reserved. Furthermore, it compares the allocated bandwidth to a known capacity threshold for identifying when lower priority users should have their access limited in order to avoid degradation in quality of service for the higher priority users.

FIG. 3 shows a preferred overall method of the invention especially adapted for a voice WLAN system. The method starts at step 45 and proceeds to check in step 46 whether a predetermined capacity threshold of a predetermined access point has been reached. If not, then a return is made to step 46 in order to re-test the allocated capacity whenever new services are requested of the access point (e.g., when a new user attempts to associate with the access point). When the capacity threshold is reached, a check is made in step 47 to determine whether there are out-of-zone users presently associated with and using resources of the predetermined access point. If there are none, then no improvement can be made by limiting out-of-zone users and a return is made to step 46 for further monitoring. If there are out-of-zone users, then an out-of-zone user is migrated off the WLAN and onto the WWAN in step 48. In step 49, steps are taken to deny allocation of resources on the access point to any new out-of-zone users that attempt to associate with the access point since sufficient access point resources (i.e., bandwidth) are not available.

FIG. 4 shows an embodiment especially adapted for a WLAN providing data services. The method starts in step 50. Each time new services are requested of the access point, a check is made in step 51 whether the allocated capacity of the access point reaches a predetermined capacity threshold. When the capacity threshold is reached, a check is made in step 52 to determine whether there are any out-of-zone users having an allocated data rate that is currently unthrottled (i.e., unreduced). Throttling of a user's data rate in effect reallocates the de-allocated bandwidth for other usage. If there are unthrottled out-of-zone users, then the data rate of one or more out-of-zone users is reduced in step 53 and a return is made to step 51 to handle further requests for service. If there are no unthrottled out-of-zone users, then a check is made in step 54 to determine whether there are any out-of-zone users currently using capacity of the predetermined access point (i.e., users who have had their data rates already reduced). If not, then no improvements can be made and a return is made to step 51. If out-of-zone users are present, then their usage is preempted or they are migrated to the WWAN in step 55. Preemption is comprised of denial of access to the WLAN. Support for data services by the WWAN is required when migrating an out-of-zone user to the WWAN.

Figure 5:
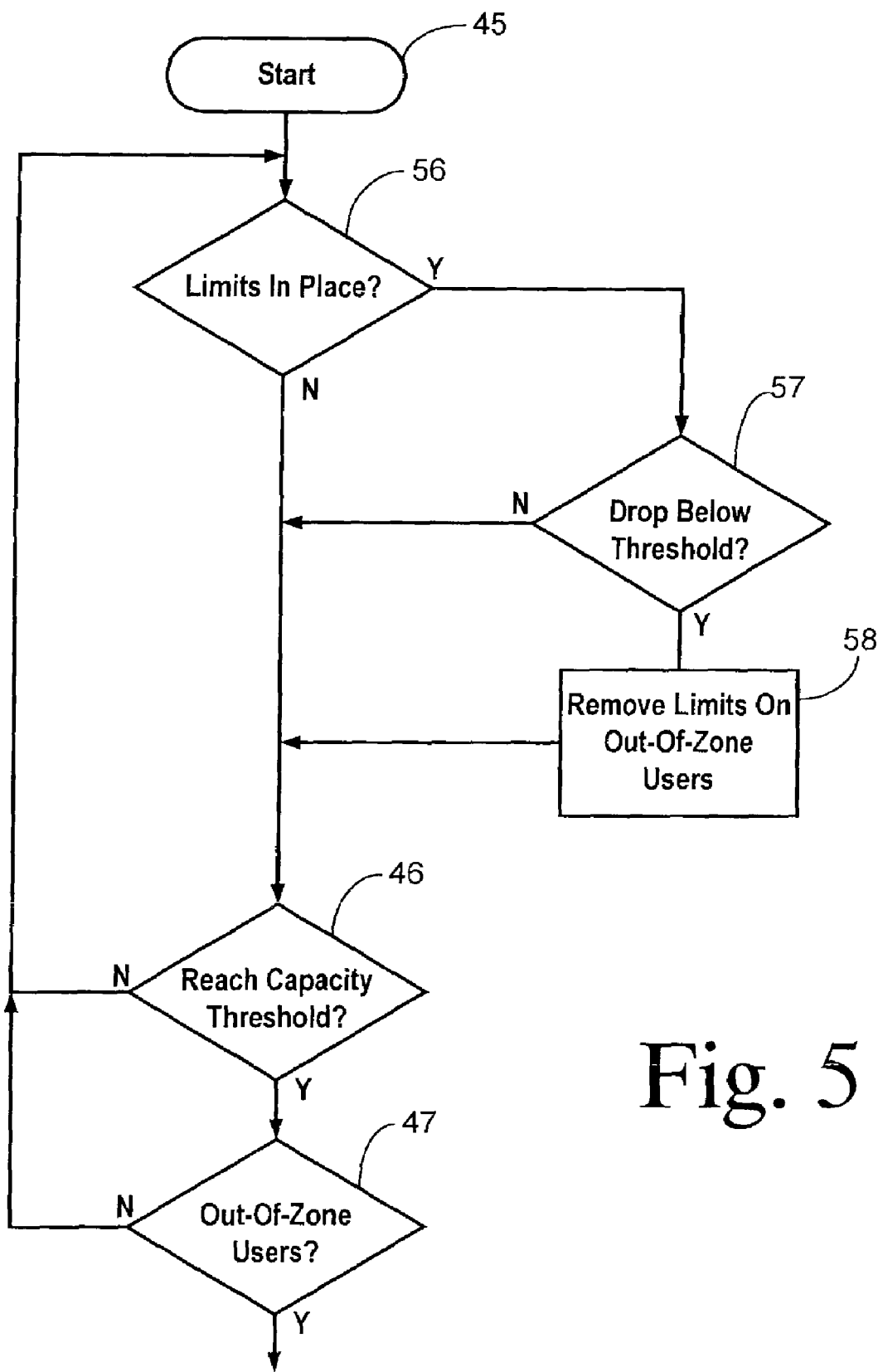
FIG. 5 is a flowchart showing a modified method for restoring access to lower priority users when capacity again becomes available.

FIG. 5 shows an optional method for reinstating usage by out-of-zone users when capacity again becomes available within the predetermined access point (e.g., as a result of other users disassociating from the access point). FIG. 5 is a modification to the method shown in FIG. 3. After starting at step 45, a check is made in step 56 to determine whether any limits have been put in place. If not, then the method proceeds with step 46 in the manner described above for FIG. 3. If limits are in place, then a check is made in step 57 to determine whether allocated bandwidth to all current in-zone and out-of-zone users has dropped below a predetermined threshold. This threshold is preferably lower than the capacity threshold used in step 46. If usage has not dropped below the threshold then no restoration is needed and the method continues on in step 46. When allocated bandwidth drops below the threshold, then limits on out-of-zone users are removed in step 58. Thus, any reduced data rates are restored to their original levels and/or new associations of out-of-zone users are no longer denied.

Figure 6:
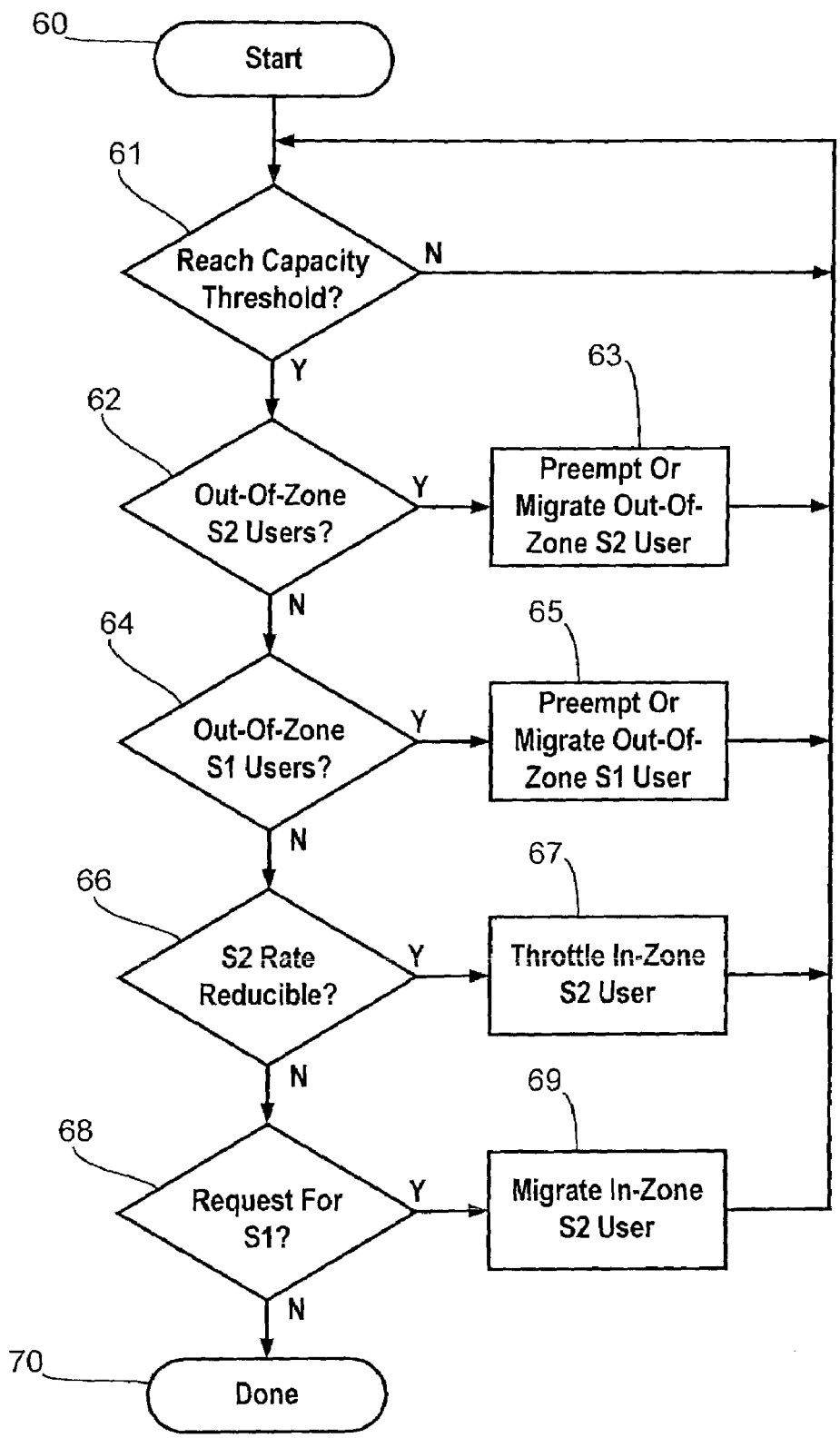
FIG. 6 is a flowchart showing a preferred method for handling mixed voice and data services.

FIG. 6 shows a preferred method for limiting out-of-zone users and/or lower priority services when the WLAN provides mixed services (i.e., a voice service and a data service). A first service S1 (e.g., voice) is provided with a higher priority than a second service S2 (e.g., data). A check is made in step 61 to determine whether allocated bandwidth of the access point has reached the capacity threshold. If yes, then a check is made in step 62 to determine whether there are out-of-zone users of service S2. If there are, then they are preempted or migrated off of the WLAN in step 63.

If there are no out-of-zone S2 users, then a check is made in step 64 to determine whether there are out-of-zone users of service S1. If so, then these users are preempted or migrated off of the WLAN in step 65. If there are none, then there are no out-of-zone users having any allocated bandwidth on the predetermined access point (assuming there are no other services besides S1 and S2).

In step 66, a check is made to determine whether there are in-zone users of service S2 for whom the associated data rate is reducible. If so, then one or more of these in-zone users of service S2 have their data rate throttled in step 67. Otherwise, if there are no in-zone S2 users whose data rate can be reduced, then a check is made in step 68 to determine whether the bandwidth being sought to be allocated (i.e., which caused the capacity threshold to be reached) is a request for the higher priority service S1. If so, then an in-zone user of the lower priority service S2 is migrated to the WWAN in step 69. Otherwise, no corrective actions can be taken and the method is finished at step 70.

According to the foregoing invention, preferential treatment for WLAN access is given to in-zone users according to specific rules to determine the need for preemption or blocking of out-of-zone users from a particular access point and/or migration of the out-of-zone user's connection to another telecommunications network, such as a WWAN (e.g., cellular, PCS, or GSM networks). These rules can be different for voice sessions and data sessions. For example, the bandwidth required for a voice-over-WLAN call is a known quantity for a given WLAN system, and rules for migrating out-of-zone users can be invoked when current capacity usage increases such that there is insufficient reserve for in-zone users. These rules may be static (e.g., 5 users allowed per access point) or dynamic (e.g., based on load balancing). Likewise, specific enterprises may determine appropriate data rates to be allocated to each employee (e.g., 128 kbps upstream and 384 kbps downstream) and generate the rules accordingly. The rules may either completely block out-of-zone users when such capacity thresholds are reached, or be configured to allow some out-of-zone users and then preempt their sessions when in-zone users initiate sessions.

What is claimed is:

1. A method of controlling access to wireless access points connected in a wireless local area network (WLAN) providing telecommunications service for authorized users with wireless handsets, said method comprising the steps of:
   registering identities of said authorized users to permit them to become associated with any of said access points;
   configuring identities of priority users for each of said access points;
   associating wireless users within range to a predetermined access point;
   aggregating a bandwidth consumption data corresponding to said wireless users who are associated to said predetermined access point;
   comparing said aggregated consumption data with a predetermined bandwidth capacity of said predetermined access point; and
   if said aggregated consumption data is not less than said predetermined bandwidth capacity then limiting use of said access point by a non-priority associated user having an identity that is not configured as one of said priority users.

2. The method of claim 1 wherein said step of limiting use comprises migrating said non-priority user to another telecommunication service.

3. The method of claim 2 wherein said another telecommunication service comprises a wireless wide area network (WWAN).

4. The method of claim 3 wherein said wireless handset of said non-priority user is compatible with both said WLAN and said WWAN.

5. The method of claim 1 wherein said telecommunication service comprises a voice service and wherein said step of limiting use comprises migrating said non-priority user to another voice service.

6. The method of claim 1 wherein said telecommunication service comprises a data service, wherein said associated wireless users are allocated respective data rates for exchanging data with said predetermined access point, and wherein said step of limiting use comprises reducing a respective data rate of said non-priority user.

7. The method of claim 6 further comprising the steps of:
   after reducing said respective data rate, then aggregating an updated bandwidth consumption data;
   comparing said updated aggregated consumption data with said predetermined bandwidth capacity of said predetermined access point; and
   if said updated aggregated consumption data is not less than said predetermined bandwidth capacity then migrating said non-priority user to another telecommunication service.

8. The method of claim 1 wherein said telecommunication service comprises a first service and a second service, wherein said first service has a higher priority than said second service, and wherein said step of limiting use comprises migrating a non-priority user of said second service to another telecommunication service.

9. The method of claim 8 further comprising the steps of:
   after migrating said non-priority user of said second service, then aggregating an updated bandwidth consumption data;
   comparing said updated aggregated consumption data with said predetermined bandwidth capacity of said predetermined access point; and
   if said updated aggregated consumption data is not less than said predetermined bandwidth capacity then migrating a non-priority user of said first service to another telecommunication service.

10. The method of claim 9 further comprising the steps of:
    after migrating said non-priority user of said first service, then aggregating an updated bandwidth consumption data;
    comparing said updated aggregated consumption data with said predetermined bandwidth capacity of said predetermined access point; and
    if said updated aggregated consumption data is not less than said predetermined bandwidth capacity then migrating a priority user of said second service to another telecommunication service.

11. The method of claim 9 wherein said associated wireless users of said second service are allocated respective data rates for exchanging data with said predetermined access point, said method further comprising the steps of:
    after migrating said non-priority user of said first service, then aggregating an updated bandwidth consumption data;
    comparing said updated aggregated consumption data with said predetermined bandwidth capacity of said predetermined access point; and
    if said updated aggregated consumption data is not less than said predetermined bandwidth capacity then reducing a respective data rate of a priority user of said second service.

12. The method of claim 8 further comprising the steps of:
    after migrating said non-priority user of said second service, then aggregating an updated bandwidth consumption data;
    comparing said updated aggregated consumption data with said predetermined bandwidth capacity of said predetermined access point; and
    if said updated aggregated consumption data is not less than said predetermined bandwidth capacity then migrating a priority user of said second service to another telecommunication service.

13. The method of claim 1 further comprising the step of:
denying any use of said predetermined access point to a non-priority user that requests association with said predetermined access point during a time that use of an already associated user is being limited.

14. The method of claim 1 wherein said WLAN includes a plurality of access points located in a workplace serving a plurality of persons each having a primary workstation within said workplace, and wherein said identified priority users of said predetermined access point are comprised of persons having their primary workstation in close proximity to said predetermined access point.

15. A wireless local area network (WLAN) telecommunications system comprising:
- a plurality of access points for wireless communication with a plurality of wireless handsets for providing a telecommunications service to a plurality of authorized users;
- a database for registering identities of said authorized users to permit them to become associated with any of said access points, wherein each identity identifies at least one predetermined access point for which a respective user is an in-zone user for priority usage of said predetermined access point;
- a local area network interconnecting said access points; and
- an access point controller coupled to a predetermined one of said access points and accessing said database of identities of in-zone users for priority usage of said predetermined access point, wherein said access point controller associates wireless users within range to said predetermined access point aggregates a bandwidth consumption corresponding to said associated wireless users, compares said aggregated consumption with a predetermined bandwidth capacity of said predetermined access point, and if said aggregated consumption is not less than said predetermined bandwidth capacity then limits use of said access point by an out-of-zone user associated to said predetermined access point having an identity that does not correspond to one of said in-zone users.

16. The WLAN telecommunications system of claim 15 wherein said telecommunications service includes a voice service, wherein said system further comprises a gateway for coupling said local area network to a wireless wide area network (WWAN), and wherein said access point controller migrates said out-of-zone user to said WWAN.

17. The WLAN telecommunications system of claim 15 wherein said telecommunications service includes a data service provided to each associated user at a respective data rate and wherein said access point controller reduces said respective date rate for said out-of-zone user.

18. The WLAN telecommunications system of claim 15 wherein said plurality of access points are located in a workplace serving a plurality of persons, wherein each person has a primary workstation within said workplace, and wherein said in-zone users of said predetermined access point are comprised of persons having their primary workstation in close proximity to said predetermined access point.

* * * * *